(12) United States Patent
Zhuang et al.

(10) Patent No.: US 10,740,431 B2
(45) Date of Patent: Aug. 11, 2020

(54) APPARATUS AND METHOD OF FIVE DIMENSIONAL (5D) VIDEO STABILIZATION WITH CAMERA AND GYROSCOPE FUSION

(71) Applicant: Samsung Electronics Co., Ltd., Gyeonggi-do (KR)

(72) Inventors: Binnan Zhuang, San Diego, CA (US); Dongwoon Bai, San Diego, CA (US); Jungwon Lee, San Diego, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 16/016,232

(22) Filed: Jun. 22, 2018

(65) Prior Publication Data

US 2019/0147606 A1    May 16, 2019

Related U.S. Application Data

(60) Provisional application No. 62/585,187, filed on Nov. 13, 2017.

(51) Int. Cl.
    *G06T 7/285* (2017.01)
    *H04N 13/282* (2018.01)
    (Continued)

(52) U.S. Cl.
    CPC .......... *G06F 17/12* (2013.01); *G06F 7/58* (2013.01); *G06F 17/16* (2013.01); *G06T 5/002* (2013.01);
    (Continued)

(58) Field of Classification Search
    CPC .................. G06T 7/285; H04N 5/23248
    See application file for complete search history.

(56) References Cited

U.S. PATENT DOCUMENTS

| 7,894,633 B1 | 2/2011 | Harman |
| 9,189,859 B2 | 11/2015 | Vogiatis et al. |

(Continued)

FOREIGN PATENT DOCUMENTS

| KR | 10-2016-0125715 | 11/2016 |
| KR | 10-2017-0095035 | 8/2017 |

OTHER PUBLICATIONS

"Content-Preserving Warps for 3D Video Stabilization" —Feng Liu, Hailin Jin. Michael Gleicher, Aseem Agarwala, ACM Transactions on Graphics (Proceedings of SIGGRAPH 2009) (Year: 2009).*

(Continued)

*Primary Examiner* — Mainul Hasan
(74) *Attorney, Agent, or Firm* — The Farrell Law Firm, P.C.

(57) ABSTRACT

An apparatus and method of five dimensional (5D) video stabilization with camera and gyroscope fusion. According to one embodiment, an apparatus includes a feature matcher configured to receive an image sequence and determine feature pairs in the image sequence; a residual two-dimensional (2D) translation estimator connected to the feature matcher and configured to determine a raw 2D translation path; a residual 2D translation smoother connected to the residual 2D translation estimator and configured to determine a 2D smoothed translation path; a distortion calculator connected to the residual 2D translation estimator and the residual 2D translation smoother and configured to determine a distortion grid; and a distortion compensator connected to the distortion calculator and configured to compensate for distortion in the image sequence.

23 Claims, 7 Drawing Sheets

(51) Int. Cl.
  H04N 13/204 (2018.01)
  H04N 5/232 (2006.01)
  G06T 5/00 (2006.01)
  G06T 7/80 (2017.01)
  G06F 17/12 (2006.01)
  G06F 7/58 (2006.01)
  G06F 17/16 (2006.01)
  H04N 19/00 (2014.01)

(52) U.S. Cl.
  CPC ............... *G06T 7/285* (2017.01); *G06T 7/85* (2017.01); *H04N 5/23248* (2013.01); *H04N 5/23258* (2013.01); *H04N 5/23267* (2013.01); *H04N 13/282* (2018.05); *H04N 19/00* (2013.01); *G06T 2200/04* (2013.01); *G06T 2207/10021* (2013.01); *H04N 13/204* (2018.05)

(56) References Cited

U.S. PATENT DOCUMENTS

| | | | |
|---|---|---|---|
| 9,207,773 B1 | 12/2015 | Rafii | |
| 2008/0112630 A1* | 5/2008 | Nestares | H04N 5/144 382/236 |
| 2010/0053347 A1* | 3/2010 | Agarwala | H04N 5/23248 348/208.99 |
| 2010/0253793 A1* | 10/2010 | Auberger | H04N 5/23248 348/208.4 |
| 2011/0304694 A1* | 12/2011 | Nestares | H04N 5/23254 348/46 |
| 2012/0105654 A1* | 5/2012 | Kwatra | H04N 5/23254 348/208.4 |
| 2013/0120600 A1* | 5/2013 | Jin | H04N 5/23254 348/208.4 |
| 2015/0213637 A1 | 7/2015 | Lynch | |
| 2015/0256755 A1* | 9/2015 | Wu | H04N 5/23267 348/208.6 |
| 2016/0140695 A1* | 5/2016 | Yuan | H04N 5/23267 382/103 |
| 2017/0034410 A1* | 2/2017 | Yoo | H04N 5/23216 |
| 2017/0124680 A1* | 5/2017 | Holzer | G06T 17/00 |
| 2017/0142337 A1* | 5/2017 | Kokaram | H04N 5/23238 |
| 2017/0178355 A1* | 6/2017 | Alibay | G06T 7/73 |
| 2017/0332067 A1 | 11/2017 | Ichihara et al. | |
| 2017/0353707 A1 | 12/2017 | Wang et al. | |

OTHER PUBLICATIONS

"Content-Preserving Warps for 3D Video Stabilization" —Feng Liu, Michael Gleicher, Hailin Jin, Aseem Agarwala; ACM Transactions on Graphics (Proceedings of SIGGRAPH 2009), 2009 (Year: 2009).*

Matthias Grundmann et al., "Auto-Directed Video Stabilization with Robust L1 Optimal Camera Paths", IEEE, pp. 225-232, 2011.

* cited by examiner

APPARATUS AND METHOD OF FIVE DIMENSIONAL (5D) VIDEO STABILIZATION WITH CAMERA AND GYROSCOPE FUSION

PRIORITY

This application claims priority under 35 U.S.C. § 119(e) to a U.S. Provisional Patent Application filed on Nov. 13, 2017 in the United States Patent and Trademark Office and assigned Ser. No. 62/585,187, the entire contents of which are incorporated herein by reference.

FIELD

The present disclosure relates generally to an apparatus and a method of video stabilization, and more particularly, to an apparatus and a method of 5D video stabilization with camera and gyroscope fusion.

BACKGROUND

A conventional gyroscope-based video stabilization (e.g., three dimensional (3D) stabilization) is achieved by 3D rotation smoothing and compensation. The conventional 3D stabilization approach does not consider translational camera movements. Thus, conventional gyroscope-based video stabilization suffers from large unsettled oscillations when there are large camera translations during video recording.

Conventional gyroscope-based 3D video stabilization only stabilizes a 3D rotation of a camera. The 3D rotation is usually calculated by integrating angular velocities measured by a gyroscope. The translation of a camera is not considered, because shaking due to 3D rotation is more noticeable in most scenes having objects at least several meters from the camera. However, the conventional gyroscope-based 3D video stabilization suffers from residual shaking due to large translational movements.

SUMMARY

According to one embodiment, an apparatus is provided. The apparatus includes a feature matcher configured to receive an image sequence and determine feature pairs in the image sequence; a residual two-dimensional (2D) translation estimator connected to the feature matcher and configured to determine a raw 2D translation path; a residual 2D translation smoother connected to the residual 2D translation estimator and configured to determine a 2D smoothed translation path; a distortion calculator connected to the residual 2D translation estimator and the residual 2D translation smoother and configured to determine a distortion grid; and a distortion compensator connected to the distortion calculator and configured to compensate for distortion in the image sequence.

According to one embodiment, a method is provided. The method includes receiving, by a feature matcher, an image sequence having two or more consecutive images; determining, by the feature matcher, feature pairs in the image sequence; determining, by a residual two-dimensional (2D) translation estimator that receives a raw three dimensional (3D) rotation camera path, an intra-frame 3D rotation, and a smoothed 3D rotation camera path, and the feature matcher, a raw 2D translation path; determining a 2D smoothed translation path; determining, by a distortion calculator, the 3D rotation smoother, and the residual 2D translation smoother, a distortion grid; and compensating, by a distortion compensator connected to the distortion calculator, for distortion in the image sequence.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
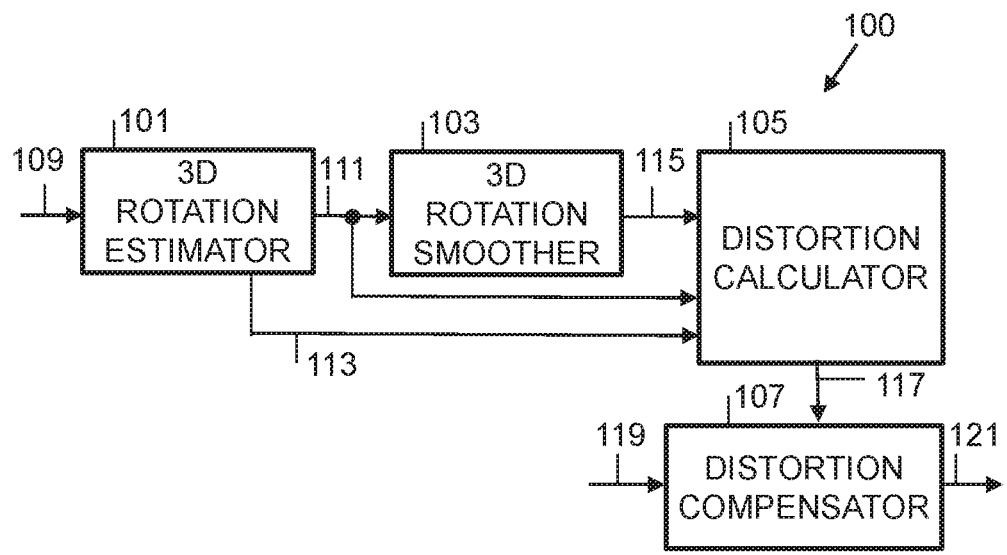
FIG. 1 illustrates a block diagram of a gyroscope-based 3D video stabilization system, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

In an embodiment, the issue of large unsettled oscillations when there are large camera translations during video recording is addressed by estimating and stabilizing a residual 2D translation after 3D rotation compensation to realize 5D video stabilization.

In an embodiment, a 5D stabilization apparatus and method fuses camera sensor and gyroscope information. A 3D rotation of a camera is directly measured from a gyroscope. After smoothing and compensating the 3D rotations, there may be remaining oscillations due to 3D translation of the camera. The 3D translations cannot be perfectly estimated or utilized due to lack of depth. Hence, a residual 2D translation is observed within an image plane, which may be estimated by fusing the gyroscope-based 3D rotation estimate and the visual information from an image sequence. The 5D video stabilization is realized by combining the 3D rotation and the residual 2D translation in motion smoothing and compensation. 5D video stabilization improves stabilization performance, especially in scenes with large translational movements.

In an embodiment, residual 2D translation is used. An estimate of 3D translation for video stabilization has been studied by addressing a "structure from motion" issue. However, such an approach may suffer from an initial scaling ambiguity and might not be able to be used for real-time stabilization due to a high computational cost. In an embodiment, a residual 2D translation is estimated to approximate an end effect in an image caused by a 3D translation, which may be effectively estimated with a low computational cost and may still capture artifacts due to 3D translation.

In an embodiment, a sensor and a vision fusion based approach is used to estimate a residual 2D translation. A 3D rotation may be easily and accurately obtained from angular velocities measured by a gyroscope as in conventional gyroscope-based video stabilization. Based on 3D rotation estimates, the 3D rotation effect may be removed from feature pairs extracted from consecutive images. With approximations, a residual 2D translation is estimated from processed feature pairs.

In an embodiment, an outlier rejection scheme based on epipolar geometry is used to select feature pairs for residual 2D translation estimation. After removing the 3D rotation effect, movements of the feature points in consecutive frames may be caused by 3D translation. Thus, lines connecting each feature pair should intersect at a vanishing point. In an embodiment, this property is used in an epipolar geometry based outlier rejection method described below.

In an embodiment, an apparatus and a method of 5D stabilization includes 3D rotation estimation, residual 2D translation estimation using sensor-vision fusion, and, combined 3D and residual 2D compensation for video stabilization and rolling shutter effect removal.

In an embodiment, residual 2D translation through gyroscope-vision fusion efficiently estimates an effect due to 3D translation of a camera, which is ignored in conventional gyroscope based video stabilization.

In an embodiment, 5D stabilization effectively removes motion jitter due to different types of motion (e.g., 3D rotation and 3D translation) of a camera, which enhances performance in the presence of translations.

Video stabilization removes undesired motion jitter and reconstructs an original shaking video to a stabilized video that satisfies the cinematographic perception of general viewers. There are two main categories of stabilization techniques, namely, optical image stabilization (OIS) and digital image stabilization (DIS). OIS is usually achieved by mechanically moving a camera lens or sensor based on instantaneous camera movements measured by a gyroscope. Thus, unwanted motions are removed before images are recorded. DIS removes unwanted motions after images are recorded. In DIS, camera motion across multiple frames may be estimated (e.g., an estimated raw path). A smoothed path is then determined based on the estimated raw path. Through an image warping process, a video may be corrected as if a camera was moving along a smoothed path. The present disclosure concerns DIS.

FIG. 1 illustrates a block diagram of a gyroscope-based 3D video stabilization system, according to one embodiment. A gyroscope-based 3D video stabilization system 100 includes a 3D rotation estimator 101, a 3D rotation smoother 103, a distortion calculator 105, and a distortion compensator 107.

The 3D rotation estimator 101 includes an input 109, a first output 111, and a second output 113. The 3D rotation estimator 101 receives angular velocities measured by a gyroscope at the input 109 and uses the angular velocities to estimate inter-frame 3D rotation of a camera and intra-frame 3D rotation, and outputs an accumulated raw 3D rotation camera path at the first output 111 and outputs the intra-frame 3D rotation at the second output 113.

The 3D rotation smoother 103 includes an input connected to the first output 111 of the 3D rotation estimator 101 and an output 115. The 3D rotation smoother 103 smoothes the raw 3D rotation camera path received from the 3D rotation estimator 101 and outputs the raw 3D rotation camera path and a smoothed 3D rotation camera path at the output 115.

The distortion calculator 105 includes a first input connected to the output 115 of the 3D rotation smoother 103, a second input connected to the first output 111 of the 3D rotation estimator 101, a third input connected to the second output 113 of the 3D rotation estimator 101, and an output 117 for providing a distorted grid. Using the raw 3D rotation camera path, the intra-frame 3D rotation, and the smoothed 3D rotation camera path, the distortion calculator 105 determines the distorted grid.

The distortion compensator 107 includes a first input connected to the output 117 of the distortion calculator 105, a second input 119, and an output 121. The distortion compensator 107 receives the distorted grid from the output 117 of the distortion calculator 105 and an image sequence at the second input 119, and uses the distorted grid to compensate for 3D rotation in the image sequence.

Figure 2:
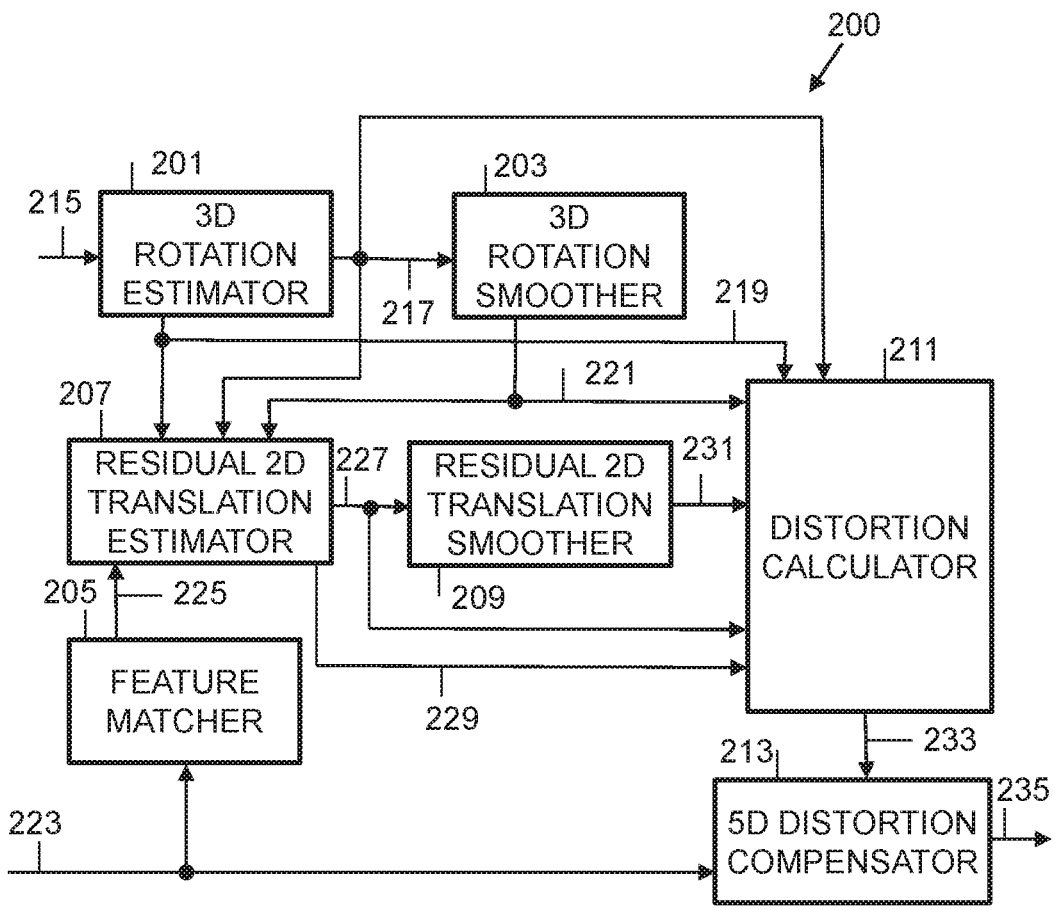
FIG. 2 illustrates a block diagram of a 5D video stabilization system, according to one embodiment.

FIG. 2 illustrates a block diagram of a 5D video stabilization system, according to one embodiment. A 5D video stabilization system 200 includes a 3D rotation estimator 201, a 3D rotation smoother 203, a feature matcher 205, a residual 2D translation estimator 207, a residual 2D translation smoother 209, a distortion calculator 211, and a 5D distortion compensator 213.

The 3D rotation estimator 201 includes an input 215, a first output 217, and a second output 219. The 3D rotation estimator 201 receives angular velocities measured by a gyroscope at the input 215 and uses the angular velocities to estimate inter-frame 3D rotation of a camera and an intra-frame 3D rotation, and outputs an accumulated raw 3D rotation camera path at the first output 217, and the intra-frame 3D rotation at the second output 219.

The 3D rotation smoother 203 includes an input connected to the first output 217 of the 3D rotation estimator 201 and an output 221. The 3D rotation smoother 203 smoothes the raw 3D rotation camera path received from the first output 217 of the 3D rotation estimator 201 and outputs the smoothed 3D rotation camera path at the output 221.

The feature matcher 205 includes an input 223 for receiving an image sequence and an output 225 for providing feature pairs. The residual 2D translation estimator 207 includes a first input connected to the first output 217 of the 3D rotation estimator 201, a second input connected to the second output 219 of the 3D rotation estimator 201, a third input connected to the output 221 of the 3D rotation smoother 203, a fourth input connected to the output 225 of the feature matcher 205, a first output 227 that provides an estimate of a residual 2D translation (i.e., a raw 2D translation path), and a second output 229 that provides an intra-frame residual 2D translation. The residual 2D translation estimator 207 receives feature pairs from two consecutive images from the output 225 of the feature matcher 205, the raw 3D rotation camera path from the first output 217 of the 3D rotation estimator 201, the intra-frame 3D rotation from the second output 219 of the 3D rotation estimator 201, and the smoothed 3D rotation camera path from the output 221 of the 3D rotation smoother 203 to estimate the residual 2D translation. The first output 227 of the residual 2D translation estimator 207 is a raw 2D translation path. The second output 229 of the residual 2D translation estimator 207 is an intra-frame residual 2D translation.

The residual 2D translation smoother 209 has an input connected to the first output 227 of the residual 2D translation estimator 207 and an output 231 for providing a smoothed 2D translation path. The residual 2D translation smoother 209 generates the smoothed 2D translation path by smoothing the corresponding raw 2D translation path received from the first output 227 of the residual 2D translation estimator 207.

The distortion calculator 211 includes a first input connected to the first output 217 of the 3D rotation estimator 201, a second input connected to the second output 219 of the 3D rotation estimator 201, a third input connected to the output 221 of the 3D rotation smoother 203, a fourth input connected to the first output 227 of the residual 2D translation estimator 207, a fifth input connected to the second output 229 of the residual 2D translation estimator 207, a sixth input connected to the output 231 of the residual 2D translation smoother 209, and an output 233 for providing a distorted grid. The distortion calculator 211 combines the raw 3D rotation camera path from the first output 217 of the 3D rotation estimator 201, the intra-frame 3D rotation from the second output 219 of the 3D rotation estimator 201, the smoothed 3D rotation camera path from the output 221 of the 3D rotation smoother 203, the raw 2D translation path from the first output 227 of the residual 2D translation estimator 207, the intra-frame residual 2D translation from the second output 229 of the residual 2D translation estimator 207, and the smoothed 2D translation path from the output 231 of the residual 2D translation smoother 209 to determine the distorted grid. Intra-frame 3D rotation and intra-frame residual 2D translation are used to determine the distorted grid in order to compensate for rolling shutter (RS) effect.

The 5D distortion compensator 213 includes a first input connected to the output 233 of the distortion calculator 211, a second input connected to the input 223 of the feature matcher 205, and an output 235. The 5D distortion compensator 213 receives the distorted grid from the output 233 of the distortion calculator 211 and an image sequence at the second input, and compensates for the distortion in the image sequence using the distorted grid.

In an embodiment, for motion estimation, epipolar geometry based outlier rejection is used for selecting feature pairs.

In an embodiment, 3D rotation may be determined by integrating angular velocities measured by a gyroscope. For smoothing camera motion, an inter-frame 3D rotation between two consecutive frames is estimated and a corresponding accumulated raw path of 3D rotation is determined. For RS compensation, an intra-frame 3D rotation is estimated. A time stamp of an nth frame is denoted as $t_n$, which corresponds to a time where a mid-row of an image is recorded. Inter-frame rotation from frame n−1 to frame n is denoted by $\Delta\theta_{n-1 \to n}$, which indicates a camera 3D rotation from $t_{n-1}$ to $t_n$ that may be determined in Equation (1):

$$\Delta\theta_{n-1 \to n} = \Sigma_{i=0}^{N} 1/2(\omega_i + \omega_{i+1})(\tau_{i+1} - \tau_i) \quad (1)$$

where $\omega_1, \ldots, \omega_N$ may be 3×1 angular velocity vectors of N≥0 gyroscope samples between $t_{n-1}$ and $t_n$, which are taken at time $\tau_1, \ldots, \tau_N$, respectively. $\tau_0$ and $\tau_{N+1}$ correspond to the time stamps of frame n−1 and frame n, i.e., $\tau_0 = t_{n-1}$ and $\tau_{N+1} = t_n$. The corresponding angular velocities at these two time instances $\omega_0$ and $\omega_{N+1}$ are obtained by interpolating the two closest gyroscope samples around $t_0$ and $T_{N+1}$, respectively. The raw 3D rotation path is determined by accumulating the inter-frame rotation from frame 0 to all subsequent frames as in Equation (2):

$$R_n = \Pi_{i=1}^{n} R(\Delta\theta_{i-1 \to i}) \quad (2)$$

where $R(\theta)$ is a transformation from rotation vector $\theta$ to its equivalent 3×3 3D rotation matrix. For $\theta$, $R(\theta)$ may be determined using either matrix exponential or the Rodrigues' rotation formula. For path smoothing, a rotation vector representation of an accumulated 3D rotation until frame n is denoted as $\theta_n$, which may be smoothed in the 3D rotation smoother 203. A rotation matrix and rotation vector of the smoothed 3D rotation camera path is denoted as $R_n'$ and $\theta_n'$, respectively.

For RS compensation, an intra-frame 3D rotation from a mid-row to all other rows is determined. A rotation from the mid row to a yth row in frame n is denoted as $\Delta\theta_n(y)$. To determine the intra-frame rotation, a rotation from a 0th row to all other rows in frame n is determined and denoted as $\theta_n(y)$. This may be achieved in the same way as described in Equation (1) above by changing $\tau_0$ to the time of the 0th row and $T_{N+1}$ to the time of the yth row. The intra-frame rotation $\Delta\theta_n(y)$ is thus determined in Equation (3):

$$\Delta\theta_n(y) = \theta_n(y) - \theta_n(y_{mid}) \quad (3)$$

where $y_{mid}$ is an index of a mid row. The equivalent rotation matrix representation of $\Delta\theta_n(y)$ is denoted as $\Delta R_n(y)$.

Gyroscope measurements only provide 3D rotation information. Translation information may be extracted from an image sequence. To estimate an inter-frame residual 2D translation from frame n−1 to frame n, the feature matcher 205 matches feature pairs between two consecutive frames. 2D image coordinates of a kth pair are denoted as $(x_{k,n-1}, x_{k,n})$ and a corresponding homogeneous coordinate representation is denoted as $(\tilde{x}_{k,n-1}, \tilde{x}_{k,n})$. Since the 2D image coordinates are projected from the same 3D world coordinate $X_k$, camera motion may be as in Equation (4):

$$\tilde{x}_{k,n} = K[R_n X_k + P_n] \quad (4)$$

where $P_n$ is a 3×1 vector representing the 3D translation in frame n and K is a 3×3 camera intrinsic matrix, which is given in Equation (5):

$$K = \begin{bmatrix} f & 0 & -u_0 \\ 0 & f & -v_0 \\ 0 & 0 & 1 \end{bmatrix} \quad (5)$$

where f is a focal length in terms of image pixel and $(u_0, v_0)$ is an origin of a camera principle axis in the image plane. To estimate the impact of 3D translation $P_n$, remove the effect of 3D rotation as in Equation (6):

$$R_n'R_n^{-1}[R_n X_k + P_n] - R_n'R_{n-1}^{-1}[R_{n-1}X_k + P_{n-1}] = [R_n'R_n^{-1}P_n - R_n'R_{n-1}^{-1}P_{n-1}] \quad (6)$$

The difference value in Equation (6) above is caused by the 3D translations after warping the image according to the desired smoothed path. $R_n'R_n^{-1}$ is used in frame n, which corresponds to the actual 3D compensation applied in frame n. However, $R_n'R_{n-1}^{-1}$ is used instead of $R_{n-1}'R_{n-1}^{-1}$ in frame n−1. This because the additional rotation given by $R_n'R_n'^{-1}$ is the desired smoothed 3D rotation camera path from frame n−1 to frame n, the residual translation impact should not contain this part. That is why $R_n'R_{n-1}^{-1} = R_n'R_n'^{-1}R_n'R_{n-1}^{-1}$ is applied in frame n−1. The difference calculation in Equation (6) cannot be directly computed, because $R_n X_k + P_n$ and $R_{n-1}X_k + P_{n-1}$ are not directly available. Hence, a distant object assumption is used, i.e., assuming the objects in the image are located at a much greater distance from the image plane relative to the focal length.

Although the difference value calculated in Equation (6) is a 3×1 vector, which reflects the 3D translation impact, it does not directly suggest the end result on the image and cannot be computed without knowing $X_k$, $P_{n-1}$ and $P_n$. Hence, the difference after normalizing to 2D coordinate is determined to obtain the residual 2D translation in the image plane using the coordinates of a feature pair. The two terms in Equation (6) can be computed as in Equations (7) and (8):

$$\tilde{y}_{k,n} = KR_n'R_n^{-1}K^{-1}\begin{bmatrix} x_{k,n} \\ 1 \end{bmatrix} \quad (7)$$

$$\tilde{z}_{k,n} = KR_n'R_{n-1}^{-1}K^{-1}\begin{bmatrix} x_{k,n-1} \\ 1 \end{bmatrix} \quad (8)$$

Both $\tilde{y}_{k,n}$ and $\tilde{z}_{k,n}$ are 3×1 vectors, i.e., $\tilde{y}_{k,n}=[\tilde{y}_{k,n}[1],\tilde{y}_{k,n}[2], \tilde{y}_{k,n}[3]]^T$ and $\tilde{z}_{k,n}=[\tilde{z}_{k,n}[1],\tilde{z}_{k,n}[2], \tilde{z}_{k,3}[3]]^T$. The residual 2D estimation given by the kth feature pair is thus determined as in Equation (9):

$$\Delta T_{k,n-1 \to n} = \begin{bmatrix} \tilde{y}_{k,n}[1]/\tilde{y}_{k,n}[3] \\ \tilde{y}'_{k,n}[2]/\tilde{y}_{k,n}[3] \end{bmatrix} - \begin{bmatrix} \tilde{z}_{k,n}[1]/\tilde{z}_{k,n}[3] \\ \tilde{z}_{k,n}[2]/\tilde{z}_{k,n}[3] \end{bmatrix} \quad (9)$$

The minimum mean square error (MMSE) estimate of the inter-frame residual 2D translation may be determined by averaging over the K feature pairs as in Equation (10):

$$\Delta T_{n-1 \to n} = \frac{1}{K} \sum_{k=0}^{K-1} \Delta T_{k,n-1 \to n} \quad (10)$$

The inter-frame residual 2D translation is accumulated to get the raw residual 2D translation path. Since $\Delta T_{n-1 \to n}$ is the residual movement despite travelling along the smoothed 3D rotation camera path, the accumulation may be determined as in Equation (11):

$$T_n = \sum_{i=1}^{n} \Delta T_{k,i-1 \to i} \quad (11)$$

The corresponding smoothed path determined based on the raw path is denoted by $T_n'$.

After the inter-frame residual 2D translation estimate is determined, the intra-frame residual 2D translation may be estimated by assuming constant translational velocities. The intra-frame translational vector from the mid-row to the yth row in frame n is as in Equation (12):

$$\Delta T_n(y) = \frac{y - y_{mid}}{2H} (\Delta T_{n-1 \to n} + \Delta T_{n \to n+1}) \quad (12)$$

where H is the total number of rows in each image. A polynomial model or a piece wise linear model may be assumed instead of the constant velocity model to capture the variation of the intra-frame translation.

The feature pairs used for residual 2D translation estimation may contain outliers depending on the view of the images and the feature detection/matching algorithm. Thus, an outlier rejection method using the special geometric property of $(\tilde{z}_{k,n},\tilde{y}_{k,n})$ calculated in Equation (7) may be used. $(\tilde{z}_{k,n},\tilde{y}_{k,n})$ may be considered as homogeneous coordinates of the pair of matching feature points. The corresponding 2D Euclidian representation is given by the normalized version as in Equation (13):

$$(z_{k,n}, y_{k,n}) = \left( \begin{bmatrix} \tilde{z}_{k,n}[1]/\tilde{z}_{k,n}[3] \\ \tilde{z}_{k,n}[2]/\tilde{z}_{k,n}[3] \end{bmatrix}, \begin{bmatrix} \tilde{y}_{k,n}[1]/\tilde{y}_{k,n}[3] \\ \tilde{y}_{k,n}[2]/\tilde{y}_{k,n}[3] \end{bmatrix} \right) \quad (13)$$

Since the different between the matching points are caused only by 3D translation, the lines connecting such feature pairs should intersect at a vanishing point according to the property in epipolar geometry. The outlier rejection method is used to reject the feature pairs that do not point to the vanishing point.

In an embodiment, an Epipolar geometry based RANSAC for outlier rejection method may be based on random sample consensus (RANSAC) as in Table 1 below.

TABLE 1

Epipolar geometry based RANSAC for outlier rejection

Input: $(\tilde{z}_{k,n}, \tilde{y}_{k,n})$ k = 1, . . . , K
Output: The index set of the inlier feature pairs Φ
Initialization:
  φ ← ∅
  For k = 1 . . . K do
    calculate the line connecting each feature pair: $\tilde{l}_{k,n} = \tilde{z}_{k,n} \times \tilde{y}_{k,n}$
  end
Repeat:
  Set temporary inlier set φ' ← ∅
  Randomly pick two feature pairs $k_1$ and $k_2$.
  Calculate the temporary vanishing point: $\tilde{v} = \tilde{l}_{k_1,n} \times \tilde{l}_{k_2,n}$
  If $(\tilde{z}_{k_1,n}, \tilde{y}_{k_1,n})$ and $(\tilde{z}_{k_2,n}, \tilde{y}_{k_2,n})$ point to the same direction
    For k = 1 . . . K do
    Calculate the line connecting the mid-point and the temporary $$\text{vanishing point: } \tilde{l}_{k \to v} = \tilde{v} \times \frac{\tilde{z}_{k,n} + \tilde{y}_{k,n}}{2}$$

Calculate the angle: $\theta_k = \angle (\tilde{l}_{k \to v}, \tilde{l}_{k,n})$
    If $(\tilde{z}_{k_1,n}, \tilde{y}_{k_1,n})$ and $(\tilde{z}_{k_2,n}, \tilde{y}_{k_2,n})$ point away from $\tilde{v}$
      If $\pi - \theta_k < \gamma$ then
        φ' ← φ' ∪ {k}.
      end
    else
      If $\theta_k < \gamma$ then
        φ' ← φ' ∪ {k}.
      end
    end
  end
  if |φ'| > |φ| then
    φ ← φ'
  end
end until the maximum number of iterations is reached.

Figure 3A:
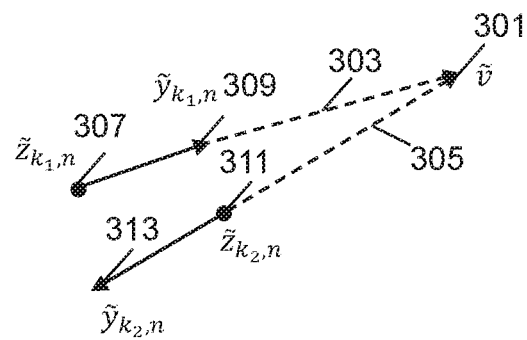
FIGS. 3A, 3B, and 3C illustrate diagrams of epipolar geometry based outlier rejection, according to one embodiment.

FIG. 3A illustrates a diagram of epipolar geometry based outlier rejection, according to one embodiment. In each RANSAC iteration, a candidate vanishing point $\tilde{v}$ 301 is calculated as the intersection of two lines 303 and 305 pointing in opposite directions and connecting, respectively, two randomly selected feature pairs, where the first feature pair includes points $\tilde{z}_{k_1,n}$ 307 and $\tilde{y}_{k_1,n}$ 309 pointing toward the candidate vanishing point $\tilde{v}$ 301 along line 303, and where the second feature pair includes points $\tilde{z}_{k_2,n}$ 311, and $\tilde{y}_{k_2,n}$ 313 pointing away from the candidate vanishing point $\tilde{v}$ 301 along line 305. In this case, the present system skips the subsequent calculation and proceeds to the next iteration.

Figure 3B:
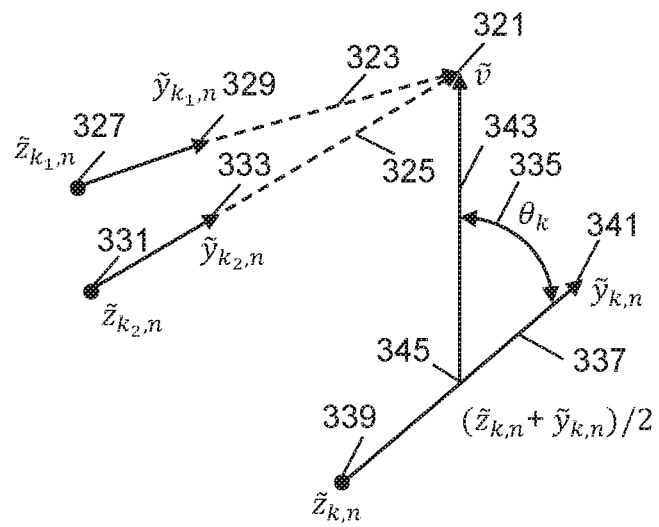

FIG. 3B illustrates a diagram of epipolar geometry based outlier rejection, according to one embodiment. In each RANSAC iteration, a candidate vanishing point $\tilde{v}$ 321 is calculated as the intersection of two lines 323 and 325 pointing in the same direction toward the candidate vanishing point $\tilde{v}$ 321 and connecting, respectively, two randomly selected feature pairs, where the first feature pair includes points $\tilde{z}_{k_1,n}$ 327 and $\tilde{y}_{k_1,n}$ 329 pointing toward the candidate vanishing point $\tilde{v}$ 321 along line 323, and where the second feature pair includes points $\tilde{z}_{k_2,n}$ 331, and $\tilde{y}_{k_2,n}$ 333 pointing toward the candidate vanishing point $\tilde{v}$ 321 along line 325. Then, for each feature pair k, an angle $\theta_k$ 335 between a line 337 connecting two feature points $\tilde{z}_{k,n}$ 339 and $\tilde{y}_{k,n}$ 341 pointing toward feature point $\tilde{y}_{k,n}$ 341 and a line 343 connecting the candidate vanishing point $\tilde{v}$ 321 and a mid-point 345 of line 337 is determined. The angle $\theta_k$ 335 measures how closely the feature pair $\tilde{z}_{k,n}$ 339 and $\tilde{y}_{k,n}$ 341 is pointing to the candidate vanishing point $\tilde{v}$ 321. If the angle $\theta_k$ 335 is less than a threshold γ, feature pair k is considered an inlier and is added to a temporary inlier set φ'. By the end of each iteration, if the temporary inlier set φ' has more feature pairs than ϕ, ϕ is updated by ϕ'. A residual 2D translation estimate will use the inliers in ϕ after the above outlier rejection procedure.

Figure 3C:
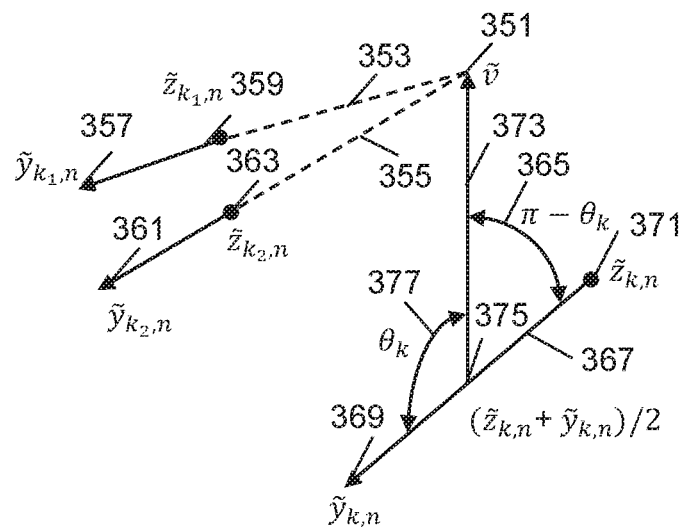

FIG. 3C illustrates a diagram of epipolar geometry based outlier rejection, according to one embodiment. In each RANSAC iteration, a candidate vanishing point $\tilde{v}$ 351 is calculated as the intersection of two lines 353 and 355 pointing in the same direction and connecting, respectively, two randomly selected feature pairs, where the first feature pair includes points $\tilde{z}_{k_1,n}$ 359 and $\tilde{y}_{k_1,n}$ 357 pointing away from the candidate vanishing point $\tilde{v}$ 351 along line 353, and where the second feature pair includes points $\tilde{z}_{k_2,n}$ 363, and $\tilde{y}_{k_2,n}$ 361 pointing away from the candidate vanishing point $\tilde{v}$ 351 along line 355. Then, for each feature pair k, an angle $\theta_k$ 377 between a line 367 connecting two feature points $\tilde{z}_{k,n}$ 371 and $\tilde{y}_{k,n}$ 369 pointing toward feature point $\tilde{y}_{k,n}$ 369 and a line 373 connecting the candidate vanishing point $\tilde{v}$ 351 and a mid-point 375 of line 367 is determined. The angle $\pi - \theta_k$ 365 measures how closely the feature pair $\tilde{z}_{k,n}$ 371 and $\tilde{y}_{k,n}$ 369 is pointing to the candidate vanishing point $\tilde{v}$ 351. If the angle $\pi - \theta_k$ 365 is less than a threshold γ, feature pair k is considered an inlier and is added to a temporary inlier set ϕ'. By the end of each iteration, if the temporary inlier set ϕ' has more feature pairs than ϕ, ϕ is updated by ϕ'. A residual 2D translation estimate will use the inliers in ϕ after the above outlier rejection procedure.

Accumulated paths for 3D rotation and residual 2D translation are smoothed to generate corresponding stabilized paths. To get a smoothed path value in frame n, a raw path from frame $n-w_1$ to frame $n+w_2$ must be considered, where $w_1$ and $w_2$ are past and future smoothing window sizes, respectively. A determination of the smoothed path may be achieved using filtering or by considering more complicated path optimization. Path smoothing parameters for 3D rotation and residual 2D translation must be considered separately, as they represent different physical motions.

An operation in the distortion calculator 211 is, for a point $x'=[x_1', x_2']$ in a compensated image, to find a corresponding coordinate $x=[x_1,x_2]$ in the raw image. The residual 2D translation related compensation occurs within the image plane. Hence, $x_T'$ is determined before the residual 2D translation compensation as in Equation (14):

$$x_T' = x' - (T_n' - T_n) + \Delta T_n(x_2'), \quad (14)$$

where $T_n'$ is the smoothed residual 2D translation path, $T_n$ is the raw residual 2D translation path, and $\Delta T_n(x_2')$ is the intra-frame residual 2D translation from the mid-row to the $x_2'$ row in frame n. For $x_T'$, the 3D rotation compensation is reversed to retrieve the corresponding coordinate in the raw image, which is performed on the 3D coordinate instead of the 2D coordinate on the image plane as in Equation (15):

$$\tilde{x} = K \Delta R_n(x_2') R_n R_n'^{-1} K^{-1} \begin{bmatrix} x_T' \\ 1 \end{bmatrix} \quad (15)$$

where $R_n'$ is the smoothed 3D rotation path, $R_n$ is the raw 3D rotation path, and $\Delta R_n(x_2')$ is the intra-frame rotation from the mid-row to the $x_2'$ row in frame n. Combining Equation (14) and Equation (15) above, z may be determined as in Equation (16):

$$\tilde{x} = K \Delta R_n(x_2') R_n R_n'^{-1} K^{-1} \begin{bmatrix} x' - (T_n' - T_n) + \Delta T_n(x_2') \\ 1 \end{bmatrix} \quad (16)$$

The final 2D coordinate x in the raw image may be obtained by determining the corresponding 2D Euclidian coordinate of the homogeneous coordinate $\tilde{x}=[\tilde{x}_1,\tilde{x}_2,\tilde{x}_3]^T$ as in Equation (17):

$$x = \begin{bmatrix} \tilde{x}_1/\tilde{x}_3 \\ \tilde{x}_2/\tilde{x}_3 \end{bmatrix} \quad (17)$$

Figure 4:
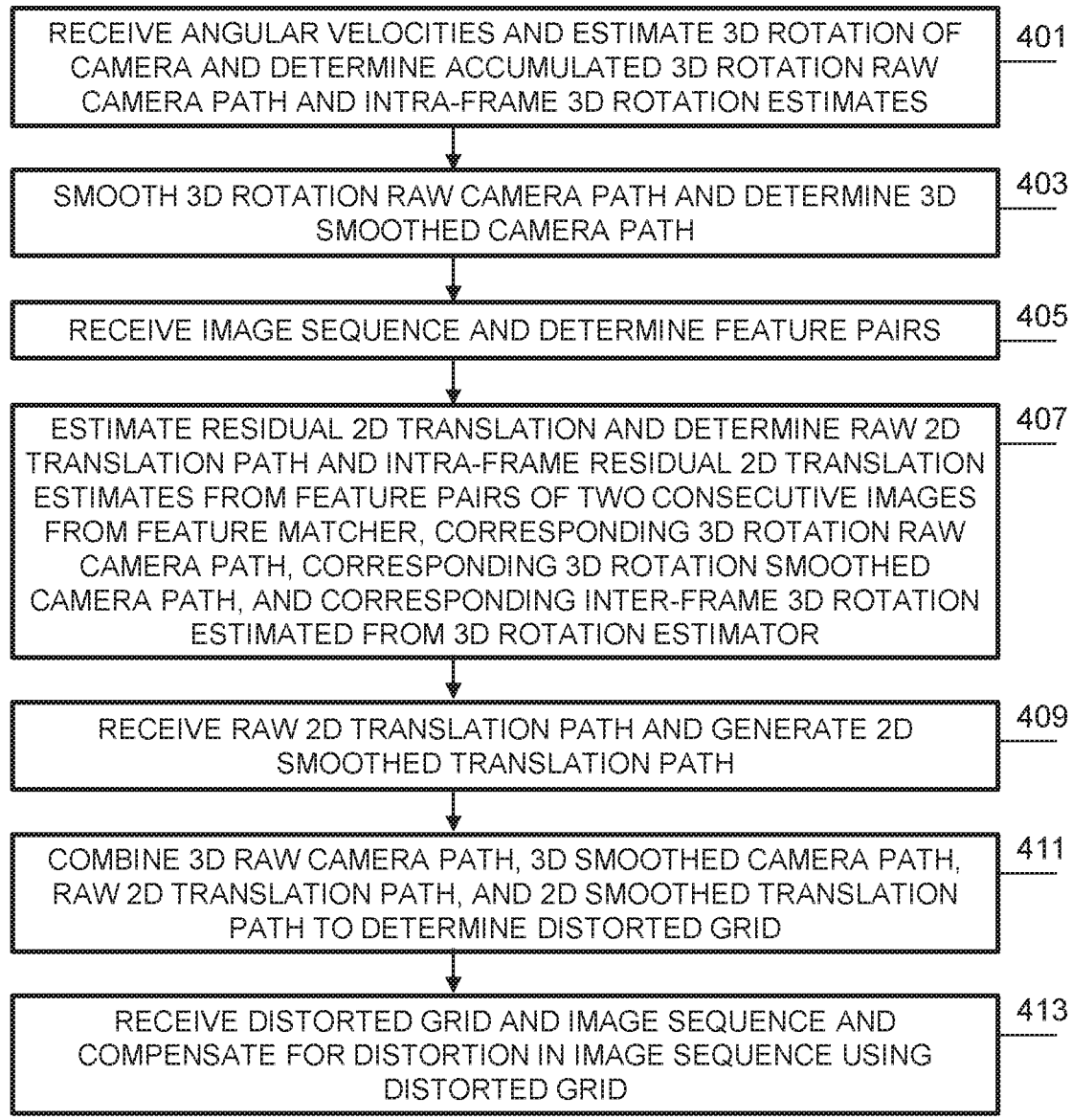
FIG. 4 illustrates another flow diagram of a method of 5D video stabilization, according to one embodiment.

FIG. 4 illustrates a flow diagram of a method of 5D video stabilization, according to one embodiment. At 401, a 3D rotation estimator (e.g., the 3D rotation estimator 201) receives angular velocities measured by a gyroscope and uses the angular velocities to estimate 3D rotation of a camera and determine an accumulated raw 3D rotation camera path and intra-frame 3D rotation estimates.

At 403, a 3D rotation smoother (e.g., the 3D rotation smoother 203) smoothes the raw 3D rotation camera path received and determine a smoothed 3D rotation camera path.

At 405, a feature matcher (e.g., the feature matcher 205) receives an image sequence and determine feature pairs.

At 407, a residual 2D translation estimator (e.g., the residual 2D translation estimator 207) uses feature pairs from two consecutive images from the feature matcher, the corresponding 3D rotation raw camera path, the corresponding 3D rotation smoothed camera path, and the corresponding intra-frame 3D rotation estimated from the 3D rotation estimator 201 to estimate the residual 2D translation and determine a raw 2D translation path and intra-frame residual 2D translation estimates.

At 409, a residual 2D translation smoother (e.g., a residual 2D translation smoother 209) receives the raw 2D translation path from the residual 2D translation estimator and generates a 2D smoothed translation path.

At 411, a distortion calculator (e.g., the distortion calculator 211) combines the raw 3D rotation camera path of the 3D rotation estimator, the smoothed 3D rotation camera path of the 3D rotation smoother, the raw 2D translation path of the residual 2D translation estimator, and the 2D smoothed translation path of the residual 2D translation smoother 209 to determine a distorted grid. In an embodiment, rolling shutter (RS) compensation is performed, where intra-frame 3D rotation and intra-frame residual 2D translation are also used to determine the distorted grid.

At 413, a 5D distortion compensator (e.g., the 5D distortion compensator 213) receives the distorted grid determined by the distortion calculator, receives an image sequence at the second input, and compensates for the distortion in the image sequence using the distorted grid.

In the apparatus of FIG. 2, an average inter-frame 2D translation is calculated in Equation (10) above, using K feature pairs distributed across an entire scene. In one embodiment, global 3D rotation compensation is performed of an entire scene and a residual 2D translation is selectively compensated for certain regions (e.g., salient regions) in the scene. For example, to compensate the 2D translations, focus on some regions in a video. Hence, instead of globally estimating a residual 2D translation in Equation (10) above, estimate an average inter-frame residual 2D translation per each class i in Equation (18):

$$\Delta T_{n-1 \rightarrow n}^i = \frac{1}{|\Omega_i|} \sum_{k \in \Omega_i} \Delta T_{k,n-1 \rightarrow n} \quad (18)$$

where $\Omega_i$ is a set of feature pairs that belongs to an ith region, and $|\Omega_i|$ is a number of feature pairs in $\Omega_i$. As a result, a raw 2D path $T_n$ in Equation (11) above, the intra-frame translation $\Delta T_n(y)$ in Equation (12) above, and a smoothed 2D path $T_n{}'$, are calculated per class as $T_n{}^i$, $\Delta T_n{}^i(y)$ and $T_n{}^{i\prime}$. The residual 2D translation compensation may be performed either globally as in Equation (13) above or individually, depending on the scenario, only using selected target regions. For example, there may be two regions due to moving objects, where one object class includes a person riding a bike. The other object class may include two people walking together. Since the 2D translation for the two regions are in opposite directions, they are compensated separately. An apparatus for selectively compensating for separate regions is described below in greater detail with reference to FIG. 5.

Figure 5:
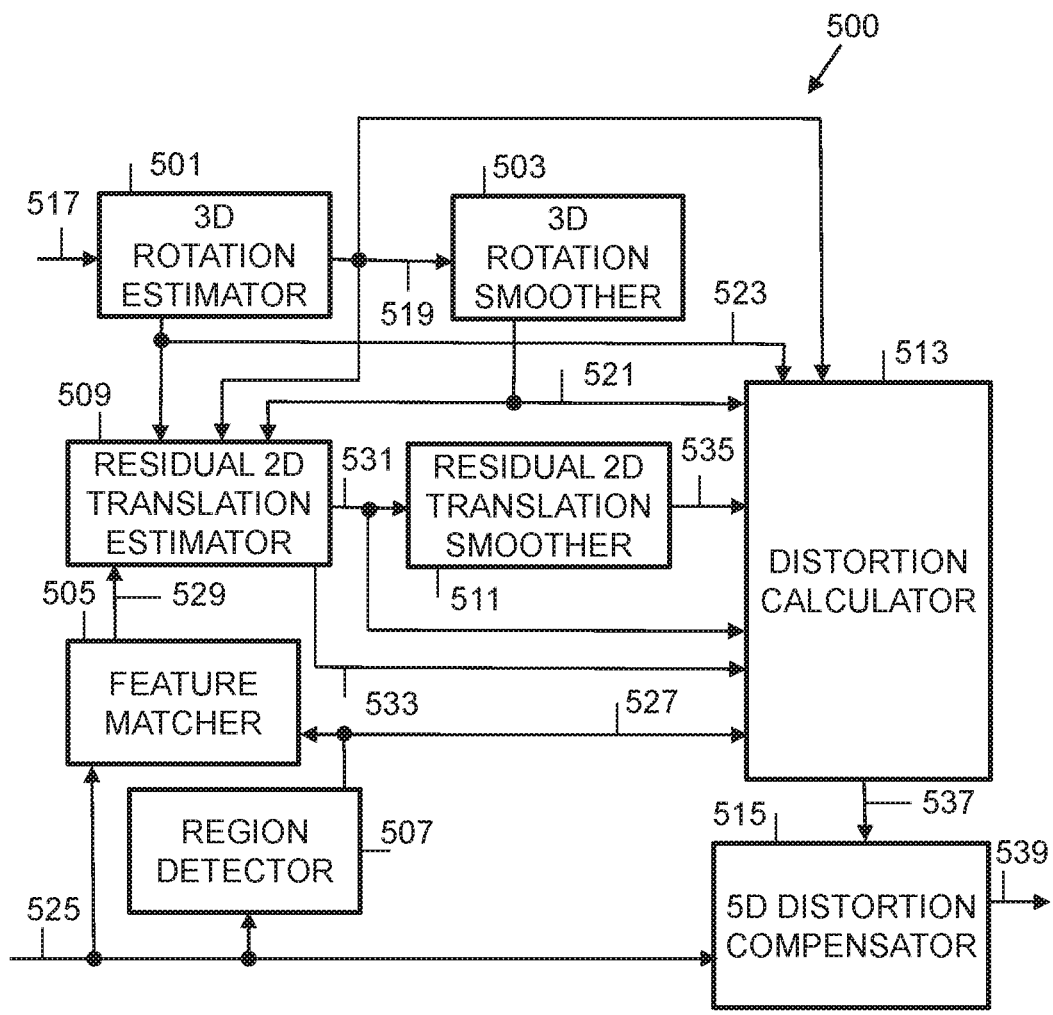
FIG. 5 illustrates a block diagram of a 5D video stabilization system, according to one embodiment.

FIG. 5 illustrates another block diagram of a 5D video stabilization system, according to one embodiment. 5D video stabilization system 500 includes a 3D rotation estimator 501, a 3D rotation smoother 503, a feature matcher 505, a region detector 507, a residual 2D translation estimator 509, a residual 2D translation smoother 511, a distortion calculator 513, and a 5D distortion compensator 515. The region detector 507 just must know the region(s) of interest where over which the motion vectors for residual 2D translation estimation are averaged. The region detector 507 may be an object detector (e.g., a face detector) but may also be based on an auto-focus block, which is different from an object detector. In an embodiment, region(s) of interest may be obtained from an autofocus block.

The 3D rotation estimator 501 includes an input 517, a first output 519, and a second output 523. The 3D rotation estimator 501 receives angular velocities measured by a gyroscope at the input 517 and uses the angular velocities to estimate inter-frame 3D rotation of a camera and intra-frame 3D rotation, and outputs an accumulated raw 3D rotation camera path at the the first output 519 and outputs the intra-frame 3D rotation at the second output 523.

The 3D rotation smoother 503 includes an input connected to the first output 519 of the 3D rotation estimator 501 and an output 521. The 3D rotation smoother 503 smooths the 3D raw rotation camera path received from the output 519 of the 3D rotation estimator 501 and outputs the smoothed 3D rotation camera path at the output 521.

The feature matcher 505 includes a first input 525 for receiving an image sequence, a second input 527 for receiving region(s) of interest, and an output 529 for providing feature pairs of the received region(s) of interest. The feature matcher 505 identifies feature pairs belonging to each region of interest.

The region detector 507 includes an input connected to the first input 525 of the feature matcher 505 for receiving the image sequence and an output 527 for providing region(s) of interest detected in the image sequence. The region detector 507 may be used to differentiate various information in an image (e.g., different objects, regions with different sharpness). The region detector 507 detects regions in an image sequence and passes information on the regions to the feature matcher 505 and the distortion calculator 513.

The residual 2D translation estimator 509 includes a first input connected to the first output 519 of the 3D rotation estimator 501, a second input connected to the second output 523 of the 3D rotation estimator 501, a third input connected to the output 521 of the 3D rotation smoother 503, a fourth input connected to the output 529 of the feature matcher 505, and an output 531 which provides an estimate of a residual 2D translation (i.e., a raw 2D translation path), and a second output 533 that provides an intra-frame residual 2D translation, for each received region(s) of interest. The residual 2D translation estimator 509 receives feature pairs from two consecutive images from the output 529 of the feature matcher 505 for each region of interest received from the feature matcher 505, the raw 3D rotation camera path from the first output 519 of the 3D rotation estimator 501, the intra-frame 3D rotation from the second output 523 of the 3D rotation estimator 501, and the smoothed 3D rotation camera path from the output 521 of the 3D rotation smoother 503 to estimate the residual 2D translation for the received regions of interest. The first output 531 of the residual 2D translation estimator 509 is a raw 2D translation path. The second output 533 of the residual 2D translation estimator 509 is the intra-frame residual 2D translation estimate.

The residual 2D translation smoother 511 has an input connected to the first output 531 of the residual 2D translation estimator 509 and an output 535 for providing a smoothed 2D translation path. The residual 2D translation smoother 511 generates the 2D smoothed translation path by smoothing the corresponding raw 2D translation path received from the residual 2D translation estimator 509.

The distortion calculator 513 includes a first input connected to the first output 519 of the 3D rotation estimator 501, a second input connected to the second output 523 of the 3D rotation estimator 501, a third input connected to the output 521 of the 3D rotation smoother 503, a fourth input connected to the first output 531 of the residual 2D translation estimator 509, a fifth input connected to the second output 533 of the residual 2D translation estimator 509, a sixth input connected to the output 535 of the residual 2D translation smoother 511, a seventh input connected to the output 527 of the erect-region detector 507, and an output 537 for providing a distorted grid. The distortion calculator 513 combines the raw 3D rotation camera path from the first output 519 of the 3D rotation estimator 501, the intra-frame 3D rotation from the second output 523 of the 3D rotation estimator 501, the smoothed 3D rotation camera path from the output 521 of the 3D rotation smoother 503, the raw 2D translation path from the first output 531 of the residual 2D translation estimator 509, the intra-frame residual 2D translation from the second output 533 of the residual 2D translation estimator 509, the smoothed 2D translation path from the output 535 of the residual 2D translation smoother 511, and the regions detected by the region detector 507 to determine the distorted grid. Intra-frame 3D rotation and intra-frame residual 2D translation are used to determine the distorted grid in order to compensate for RS. The distortion calculator 513 performs residual 2D translation compensation based on which region to which the corresponding pixel belongs.

The 5D distortion compensator 515 includes a first input connected to the output 537 of the distortion calculator 513, a second input connected to the input 525 of the feature matcher 505, and an output 539. The 5D distortion compensator 515 receives the distorted grid determined by the distortion calculator 513 and an image sequence at the second input, and compensates for the distortion in the image sequence using the distorted grid.

Figure 6:
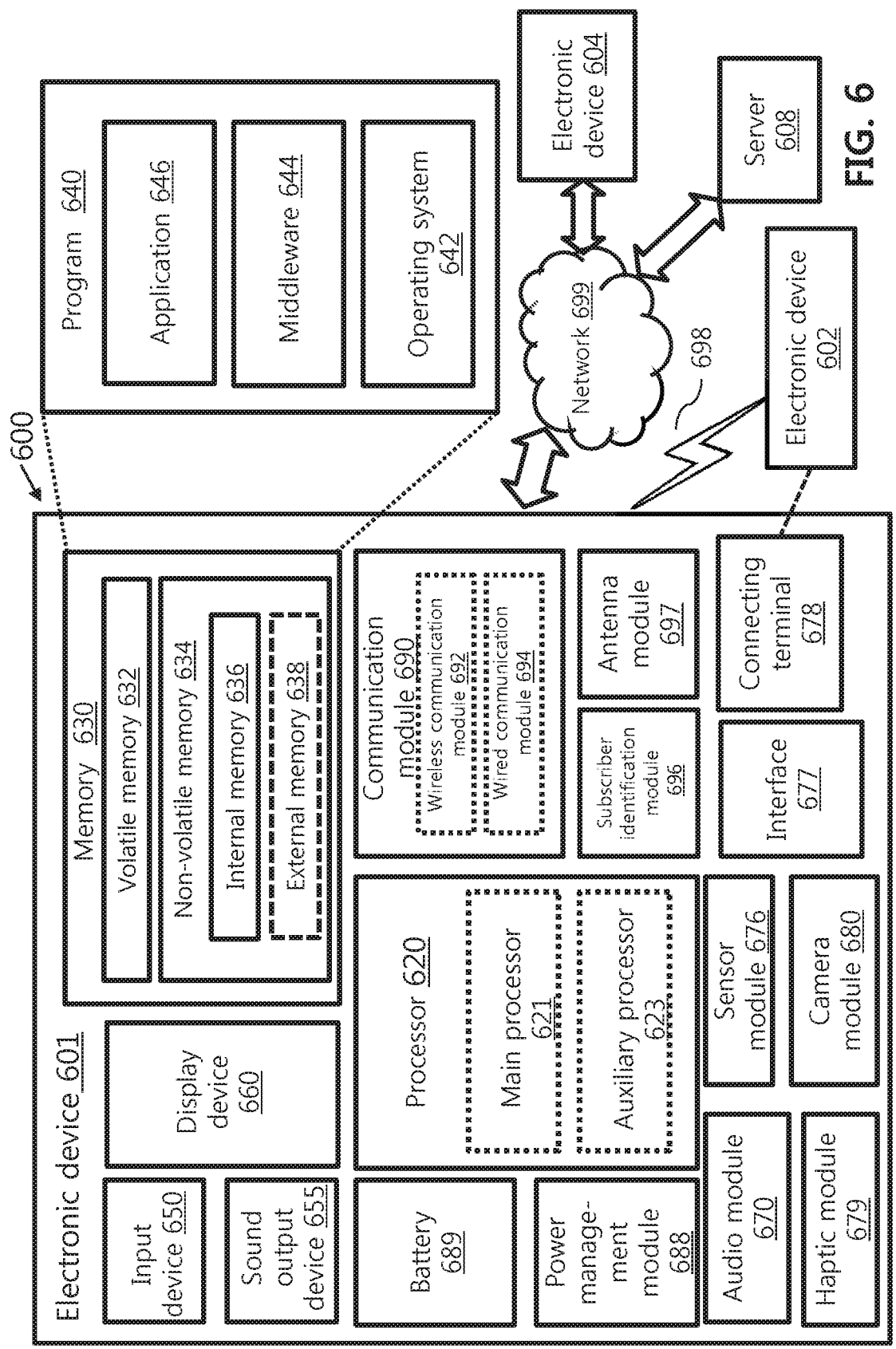
FIG. 6 illustrates a block diagram of an electronic device in a network environment, according to one embodiment.

FIG. 6 illustrates a block diagram of an electronic device in a network environment, according to one embodiment. An electronic device 601 in a network environment 600 may communicate with an electronic device 602 via a first network 698 (e.g., a short-range wireless communication network), or an electronic device 604 or a server 608 via a second network 699 (e.g., a long-range wireless communication network). According to one embodiment, the electronic device 601 may communicate with the electronic device 604 via the server 608. The electronic device 601 may include a processor 620, a memory 630, an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. According to one embodiment, as at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. According to one embodiment, the processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by other component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device (e.g., electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to one embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to one embodiment, the interface 677 may include, for example, a high definition multimedia interface (HDMI), a universal serial bus (USB) interface, a secure digital (SD) card interface, or an audio interface.

A connecting terminal 678 may include a connector via which the electronic device 601 may be physically connected with the external electronic device (e.g., the electronic device 602). According to one embodiment, the connecting terminal 678 may include, for example, an HDMI connector, a USB connector, an SD card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. According to one embodiment, the power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. According to one embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

One embodiment may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a compiler or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

Figure 7:
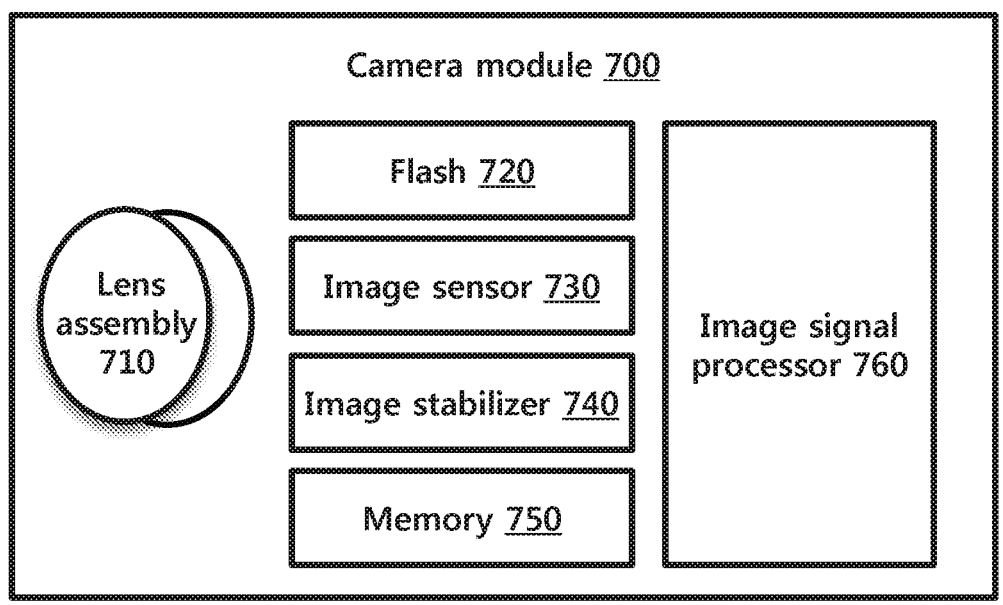
FIG. 7 illustrates a block diagram of a camera module, according to one embodiment.

FIG. 7 illustrates a block diagram of the camera module, according to one embodiment. A camera module 700 may include a lens assembly 710, a flash 720, an image sensor 730, an image stabilizer 740, a memory 750 (e.g., a buffer memory), or an image signal processor 760. The lens assembly 710 may collect light emitted or reflected from an object whose image is to be taken. The lens assembly 710 may include one or more lenses. According to one embodiment, the camera module 700 may include a plurality of lens assemblies 710. In this case, the camera module 700 may form, for example, a dual camera, a 360-degree camera, or a spherical camera. Some of the plurality of lens assemblies 710 may have the same lens attribute (e.g., view angle, focal length, auto-focusing, f number, or optical zoom), or at least one lens assembly may have one or more lens attributes that are different from those of another lens assembly. The lens assembly 710 may include, for example, a wide-angle lens or a telephoto lens.

The flash 720 may emit light that is used to reinforce light reflected from an object. According to one embodiment, the flash 720 may include one or more light emitting diodes (LEDs) (e.g., a red-green-blue (RGB) LED, a white LED, an infrared (IR) LED, or an ultraviolet (UV) LED) or a xenon lamp. The image sensor 730 may obtain an image corresponding to an object by converting light emitted or reflected from the object and transmitted via the lens assembly 710 into an electrical signal. According to one embodiment, the image sensor 730 may be selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 730 may be implemented using, for example, a charged coupled device (CCD) sensor or a complementary metal oxide semiconductor (CMOS) sensor.

The image stabilizer 740 may move the image sensor 730 or at least one lens included in the lens assembly 710 in a particular direction, or control an operational attribute (e.g., adjust the read-out timing) of the image sensor 730 in response to the movement of the camera module 700 or the electronic device 601 including the camera module 700. This allows compensating for at least part of a negative effect (e.g., image blurring) by the movement on an image being captured. According to one embodiment, the image stabilizer 740 may sense such a movement by the camera module 700 or the electronic device 601 using a gyro sensor or an acceleration sensor disposed inside or outside the camera module 700. According to one embodiment, the image stabilizer 740 may be implemented, for example, as an optical image stabilizer.

The memory 750 may store, at least temporarily, at least part of an image obtained via the image sensor 730 for a subsequent image processing task. For example, if image capturing is delayed due to shutter lag or multiple images are quickly captured, a raw image obtained (e.g., a Bayer-patterned image, a high-resolution image) may be stored in the memory 750, and its corresponding copy image (e.g., a low-resolution image) may be previewed via the display device 660. Thereafter, if a specified condition is met (e.g., by a user's input or system command), at least part of the raw image stored in the memory 750 may be obtained and processed, for example, by the image signal processor 760. According to one embodiment, the memory 750 may be configured as at least part of the memory 630 or as a separate memory that is operated independently from the memory 630.

The image signal processor 760 may perform one or more image processing with respect to an image obtained via the image sensor 730 or an image stored in the memory 750. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 760 may perform control (e.g., exposure time control or read-out timing control) with respect to at least one (e.g., the image sensor 730) of the components included in the camera module 700. An image processed by the image signal processor 760 may be stored in the memory 750 for further processing, or may be provided to an external component (e.g., the memory 630, the display device 660, the electronic device 602, the electronic device 604, or the server 608) outside the camera module 700. According to one embodiment, the image signal processor 760 may be configured as at least part of the processor 620, or as a separate processor that is operated independently from the processor 620. If the image signal processor 760 is configured as a separate processor from the processor 620, at least one image processed by the image signal processor 760 may be displayed, by the processor 620, via the display device 660 as it is or after being further processed.

According to one embodiment, the electronic device 601 may include a plurality of camera modules 700 having different attributes or functions. In this case, at least one of the plurality of camera modules 700 may form, for example, a wide-angle camera and at least another of the plurality of camera modules 700 may form a telephoto camera. Similarly, at least one of the plurality of camera modules 700 may form, for example, a front camera and at least another of the plurality of camera modules 700 may form a rear camera.

Figure 8:
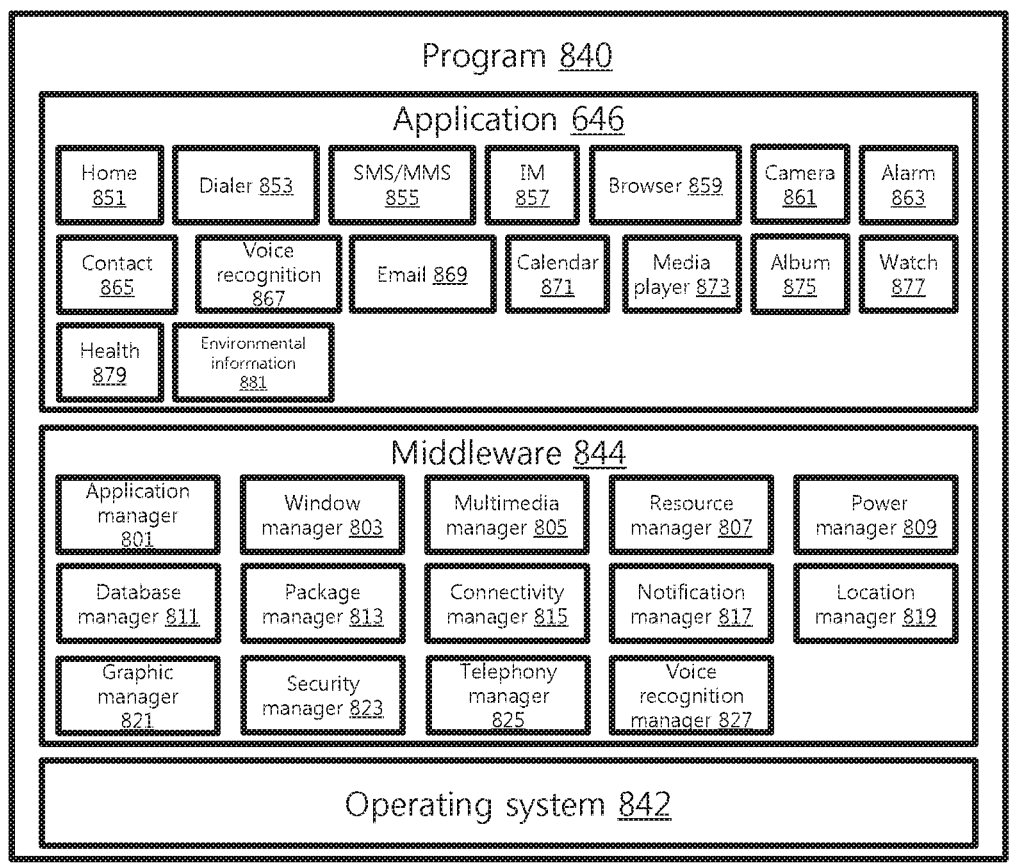
FIG. 8 illustrates a block diagram of a computer program, according to one embodiment.

FIG. 8 illustrates a block diagram of a computer program, according to one embodiment. A program 840 may include an OS 842 to control one or more resources of an electronic device (e.g., 601), middleware 844, or an application 846 executable in the OS 842. The OS 842 may include, for example, Android®, iOS®, Windows®, Symbian®, Tizen®, or Bada™. At least part of the program 840, for example, may be pre-loaded on the electronic device during manufacture, or may be downloaded from or updated by an external electronic device (e.g., the electronic device 602 or 604, or the server 608) during use by a user.

The OS 842 may control management (e.g., allocating or deallocation) of one or more system resources (e.g., process, memory, or power source) of the electronic device 601. The OS 842, additionally or alternatively, may include one or more driver programs to drive other hardware devices of the electronic device 601, for example, the input device 650, the sound output device 655, the display device 660, the audio module 670, the sensor module 676, the interface 677, the haptic module 679, the camera module 680, the power management module 688, the battery 689, the communication module 690, the subscriber identification module 696, or the antenna module 697.

The middleware 844 may provide various functions to the application 846 such that a function or information provided from one or more resources of the electronic device 601 may be used by the application 846. The middleware 844 may include, for example, an application manager 801, a window manager 803, a multimedia manager 805, a resource manager 807, a power manager 809, a database manager 811, a package manager 813, a connectivity manager 815, a notification manager 817, a location manager 819, a graphic manager 821, a security manager 823, a telephony manager 825, or a voice recognition manager 827.

The application manager 801, for example, may manage the life cycle of the application 846. The window manager 803, for example, may manage one or more graphical user interface (GUI) resources that are used on a screen. The multimedia manager 805, for example, may identify one or more formats to be used to play media files, and may encode or decode a corresponding one of the media files using a codec appropriate for a corresponding format selected from the one or more formats. The resource manager 807, for example, may manage the source code of the application 846 or a memory space of the memory 830. The power manager 809, for example, may manage the capacity, temperature, or power of the battery 689, and determine or provide related information to be used for the operation of the electronic device 601 based at least in part on corresponding information of the capacity, temperature, or power of the battery 689. According to one embodiment, the power manager 809 may interoperate with a basic input/output system (BIOS) of the electronic device 601.

The database manager 811, for example, may generate, search, or change a database to be used by the application 846. The package manager 813, for example, may manage installation or update of an application that is distributed in the form of a package file. The connectivity manager 815, for example, may manage a wireless connection or a direct connection between the electronic device 601 and the external electronic device. The notification manager 817, for example, may provide a function to notify a user of an occurrence of a specified event (e.g., an incoming call, message, or alert). The location manager 819, for example, may manage locational information on the electronic device 601. The graphic manager 821, for example, may manage one or more graphic effects to be offered to a user or a user interface related to the one or more graphic effects.

The security manager 823, for example, may provide system security or user authentication. The telephony manager 825, for example, may manage a voice call function or a video call function provided by the electronic device 601. The voice recognition manager 827, for example, may transmit a user's voice data to the server 608, and receive, from the server 608, a command corresponding to a function to be executed on the electronic device 601 based at least in part on the voice data, or text data converted based at least in part on the voice data. According to one embodiment, the middleware 844 may dynamically delete some existing components or add new components. According to one embodiment, at least part of the middleware 844 may be included as part of the OS 842 or may be implemented in other software separate from the OS 842.

The application 846 may include, for example, a home application 851, a dialer application 853, a short message service (SMS)/multimedia messaging service (MMS) application 855, an instant message (IM) application 857, a browser application 859, a camera application 861, an alarm application 863, a contact application 865, a voice recognition application 867, an email application 869, a calendar application 871, a media player application 873, an album application 875, a watch application 877, a health application 879 (e.g., for measuring the degree of workout or biometric information, such as blood sugar), or an environmental information application 881 (e.g., for measuring air pressure, humidity, or temperature information). According to one embodiment, the application 846 may further include an information exchanging application that is capable of supporting information exchange between the electronic device 601 and the external electronic device. The information exchange application, for example, may include a notification relay application adapted to transfer designated information (e.g., a call, a message, or an alert) to the external electronic device or a device management application adapted to manage the external electronic device. The notification relay application may transfer notification information corresponding to an occurrence of a specified event (e.g., receipt of an email) at another application (e.g., the email application 869) of the electronic device 601 to the external electronic device. Additionally or alternatively, the notification relay application may receive notification information from the external electronic device and provide the notification information to a user of the electronic device 601.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
   a three-dimensional (3D) rotation estimator processor configured to determine a raw 3D rotation camera path and intra-frame 3D rotation estimates;
   a feature matcher processor configured to receive an image sequence and determine feature pairs in the image sequence;
   a residual two-dimensional (2D) translation estimator processor connected to the feature matcher processor and the 3D rotation estimator processor, and configured to determine a raw 2D translation path;
   a residual 2D translation smoother processor connected to the residual 2D translation estimator processor and configured to determine a 2D smoothed translation path;
   a distortion calculator processor connected to the residual 2D translation estimator processor and the residual 2D translation smoother processor and configured to determine a distortion grid; and
   a distortion compensator processor connected to the distortion calculator processor and configured to compensate for distortion in the image sequence,
   wherein the three-dimensional (3D) rotation estimator processor is further configured to determine the raw 3D rotation camera path by receiving angular velocities of a camera and estimating 3D rotation of the camera.

2. The apparatus of claim 1, further comprising:
   a 3D rotation smoother processor connected to the 3D rotation estimator processor and configured to determine a smoothed 3D rotation camera path.

3. The apparatus of claim 2, wherein the three-dimensional (3D) rotation estimator processor is further configured to determine the raw 3D rotation camera path by receiving angular velocities of a camera and estimating the intra-frame 3D rotation of the camera.

4. The apparatus of claim 2, further comprising a gyroscope connected to the 3D rotation estimator processor and configured to determine the angular velocities of a camera.

5. The apparatus of claim 2, wherein the 3D rotation smoother processor is further configured to determine the smoothed 3D rotation camera path by smoothing the raw 3D rotation camera path.

6. The apparatus of claim 1, wherein the feature matcher processor is further configured to determine feature pairs in the image sequence using an outlier rejection method based on epipolar geometry.

7. The apparatus of claim 6, wherein the outlier rejection method comprises:
   randomly selecting a first feature pair and a second feature pair;
   determining a first line based on the first feature pair and a second line based on the second feature pair;
   determining a vanishing point based on the first line and the second line;
   determining, for each feature pair, a third line;
   determining, for the third line for each feature pair, a fourth line that connects the vanishing point to a mid-point of the third line;
   determining, for each feature pair, an angle between the third line and the fourth line; and rejecting each feature pair as an outlier that has an angle greater than a threshold.

8. The apparatus of claim 1, wherein the residual two-dimensional (2D) translation estimator processor is further configured to determine intra-frame residual 2D translation estimates and the raw 2D translation path using feature pairs of two consecutive images, a raw 3D rotation camera path, a smoothed 3D rotation camera path, and a intra-frame 3D rotation.

9. The apparatus of claim 1, wherein the residual two-dimensional (2D) translation estimator processor is further configured to determine the raw 2D translation path from feature pairs of two consecutive images and corresponding intra-frame 3D rotation.

10. The apparatus of claim 1, wherein the distortion calculator processor is further configured to determine the distortion grid by combining a raw 3D camera path, a 3D smoother camera path, a 3D intra-frame rotation, the raw 2D translation path, the smoothed 2D translation path and a residual 2D intra-frame translation.

11. The apparatus of claim 1, wherein the distortion compensator processor is further configured to compensate for distortion in the image sequence by receiving the image sequence and using the distortion grid.

12. The apparatus of claim 1, further comprising an object detector processor connected to the feature matcher processor and the distortion calculator processor and configured to receive the image sequence and determine object classes.

13. A method, comprising:
determining, by a three-dimensional (3D) rotation estimator processor, a raw 3D rotation camera path;
determining, by a 3D rotation smoother processor connected to the 3D rotation estimator processor, a smoothed 3D rotation camera path;
determining, by the 3D rotation estimator processor, estimates for an intra-frame 3D rotation;
receiving, by a feature matcher processor, an image sequence having two or more consecutive images;
determining, by the feature matcher processor, feature pairs in the image sequence;
determining, by a residual two-dimensional (2D) translation estimator processor that receives the raw 3D rotation camera path from the 3D rotation estimator processor, the intra-frame 3D rotation, the smoothed 3D rotation camera path, and the feature matcher processor, a raw 2D translation path;
determining a 2D smoothed translation path;
determining, by a distortion calculator processor, the 3D rotation smoother, and the residual 2D translation smoother, a distortion grid;
determining the raw 3D rotation camera path by receiving angular velocities of a camera and estimating 3D rotation of the camera; and
compensating, by a distortion compensator processor connected to the distortion calculator processor, for distortion in the image sequence.

14. The method of claim 13, further comprising determining, by the three-dimensional (3D) rotation estimator processor, the raw 3D rotation camera path by receiving angular velocities of a camera and estimating the inter-frame 3D rotation of the camera.

15. The method of claim 13, further comprising determining, by a gyro-scope connected to the 3D rotation estimator, the angular velocities of a camera.

16. The method of claim 13, further comprising determining, by the 3D rotation smoother processor, the smoothed 3D rotation camera path by smoothing the raw 3D rotation camera path.

17. The method of claim 13, further comprising determining, by the feature matcher processor, feature pairs in the image sequence using an outlier rejection method based on epipolar geometry.

18. The method of claim 17, wherein the outlier rejection method comprises:
randomly selecting a first feature pair and a second feature pair;
determining a first line based on the first feature pair and a second line based on the second feature pair;
determining a vanishing point based on the first line and the second line;
determining, for each feature pair, a third line;
determining, for the third line for each feature pair, a fourth line that connects the vanishing point to a mid-point of the third line;
determining, for each feature pair, an angle between the third line and the fourth line; and
rejecting each feature pair as an outlier that has an angle greater than a threshold.

19. The method of claim 13, further comprising determining, by the residual two-dimensional (2D) translation estimator processor, intra-frame residual 2D translation estimates and the raw 2D translation path using feature pairs of two consecutive images, the 3D rotation raw camera path, the 3D rotation smoothed camera path, the smoothed 3D rotation camera path, and the intra-frame 3D rotation.

20. The method of claim 13, further comprising, by the residual two-dimensional (2D) translation estimator processor, determining the raw 2D translation path from feature pairs of two consecutive images and corresponding intra-frame 2D translation.

21. The method of claim 13, further comprising determining, by the distortion calculator processor, the distortion grid by combining the raw 3D rotation camera path, the 3D smoother camera path, the 3D intra-frame rotation, the raw 2D translation path, the smoothed 2D translation path, and a residual 2D intra-frame translation.

22. The method of claim 13, further comprising compensating, by the distortion compensator processor, for distortion in the image sequence by receiving the image sequence and using the distortion grid.

23. The method of claim 13, further comprising determining, by a region detector processor, at least one region.

* * * * *